United States Patent
Myung et al.

(10) Patent No.: US 11,646,981 B2
(45) Date of Patent: May 9, 2023

(54) PROVIDING INSTANT MESSAGING SERVICE

(71) Applicant: KAKAO CORP., Jeju-si (KR)

(72) Inventors: No Suk Myung, Yongin-si (KR); Ji Soo Hwang, Yongin-si (KR); Jun Ki Kim, Suwon-si (KR)

(73) Assignee: KAKAO CORP., Jeju-Do (KR)

( * ) Notice: Subject to any disclaimer, the term of this patent is extended or adjusted under 35 U.S.C. 154(b) by 241 days.

(21) Appl. No.: 16/215,907

(22) Filed: Dec. 11, 2018

(65) Prior Publication Data
US 2019/0182184 A1    Jun. 13, 2019

(30) Foreign Application Priority Data

Dec. 11, 2017 (KR) .................. 10-2017-0169712

(51) Int. Cl.
*H04L 51/02* (2022.01)
*H04L 51/04* (2022.01)

(52) U.S. Cl.
CPC .............. *H04L 51/02* (2013.01); *H04L 51/04* (2013.01)

(58) Field of Classification Search
CPC ......... H04L 51/02; H04L 51/04; H04L 51/00; H04L 51/06
See application file for complete search history.

(56) References Cited

U.S. PATENT DOCUMENTS

| 2001/0040887 A1* | 11/2001 | Shtivelman | ......... H04M 3/5237 370/352 |
| 2008/0147470 A1* | 6/2008 | Johri | .............. G06Q 10/063114 379/265.11 |
| 2011/0178831 A1* | 7/2011 | Ravichandran | ......... H04L 67/02 705/7.11 |
| 2012/0110099 A1* | 5/2012 | Fujihara | .............. H04L 12/1818 709/206 |
| 2013/0346886 A1* | 12/2013 | Cauchois | .............. H04L 51/046 715/758 |
| 2014/0072117 A1* | 3/2014 | Barinov | .................. H04M 3/51 379/266.07 |

(Continued)

FOREIGN PATENT DOCUMENTS

| JP | 2001337827 A | 12/2001 |
| KR | 1020040040115 A | 5/2004 |

(Continued)

*Primary Examiner* — Thu V Nguyen
*Assistant Examiner* — Aye M Aung
(74) *Attorney, Agent, or Firm* — Hamre, Schumann, Mueller & Larson, P.C.

(57) ABSTRACT

A chatbot server that provides an instant messaging service using a virtual chatbot linked to multiple real chatbots includes a receiving unit that receives, from a messenger server, a question message relevant to a service selected from multiple services by a user device and service account information corresponding to the selected service; a derivation unit that derives an answer to the question message using the virtual chatbot corresponding to the service account information; and a transmission unit that transmits the answer to the messenger server, wherein the virtual chatbot transfers the question message to a selected real chatbot of the multiple real chatbots linked to the virtual chatbot, and the selected real chatbot derives the answer to the question message and transfers the answer to the virtual chatbot.

17 Claims, 8 Drawing Sheets

(56) References Cited

U.S. PATENT DOCUMENTS

| | | | |
|---|---|---|---|
| 2016/0110422 A1* | 4/2016 | Roytman | G06N 5/00 |
| | | | 706/12 |
| 2017/0324868 A1* | 11/2017 | Tamblyn | H04L 51/046 |
| 2018/0048865 A1* | 2/2018 | Taylor | G06Q 20/042 |
| 2018/0174020 A1* | 6/2018 | Wu | G06N 3/08 |
| 2018/0181558 A1* | 6/2018 | Emery | H04L 51/02 |
| 2018/0234550 A1* | 8/2018 | Lifson | H04W 12/06 |
| 2018/0359205 A1* | 12/2018 | Karnati | G06F 9/451 |
| 2019/0005024 A1* | 1/2019 | Somech | H04L 67/306 |
| 2019/0019077 A1* | 1/2019 | Griffin | G06N 5/041 |
| 2019/0354557 A1* | 11/2019 | Kornblit | G06Q 30/0281 |
| 2020/0042597 A1* | 2/2020 | Wu | G06F 40/237 |
| 2020/0128130 A1* | 4/2020 | Geary | H04M 3/5232 |
| 2020/0213251 A1* | 7/2020 | Shah | G06N 20/00 |

FOREIGN PATENT DOCUMENTS

| | | |
|---|---|---|
| KR | 1020050039364 A | 4/2005 |
| KR | 1020080075748 A | 8/2008 |
| KR | 101605430 B1 | 3/2016 |

\* cited by examiner

FIG. 7

| USER ID | VIRTUAL CHATBOT ID | REAL CHATBOT ID | SESSION INFORMATION |
|---------|--------------------|-----------------|---------------------|
| USER 1 | FIRST VIRTUAL CHATBOT | FIRST REAL CHATBOT | CHAT STATE INFORMATION, CHAT CONTEXT INFORMATION, CHAT TIME INFORMATION |
| USER 1 | SECOND VIRTUAL CHATBOT | THIRD REAL CHATBOT | CHAT STATE INFORMATION, CHAT CONTEXT INFORMATION, CHAT TIME INFORMATION |

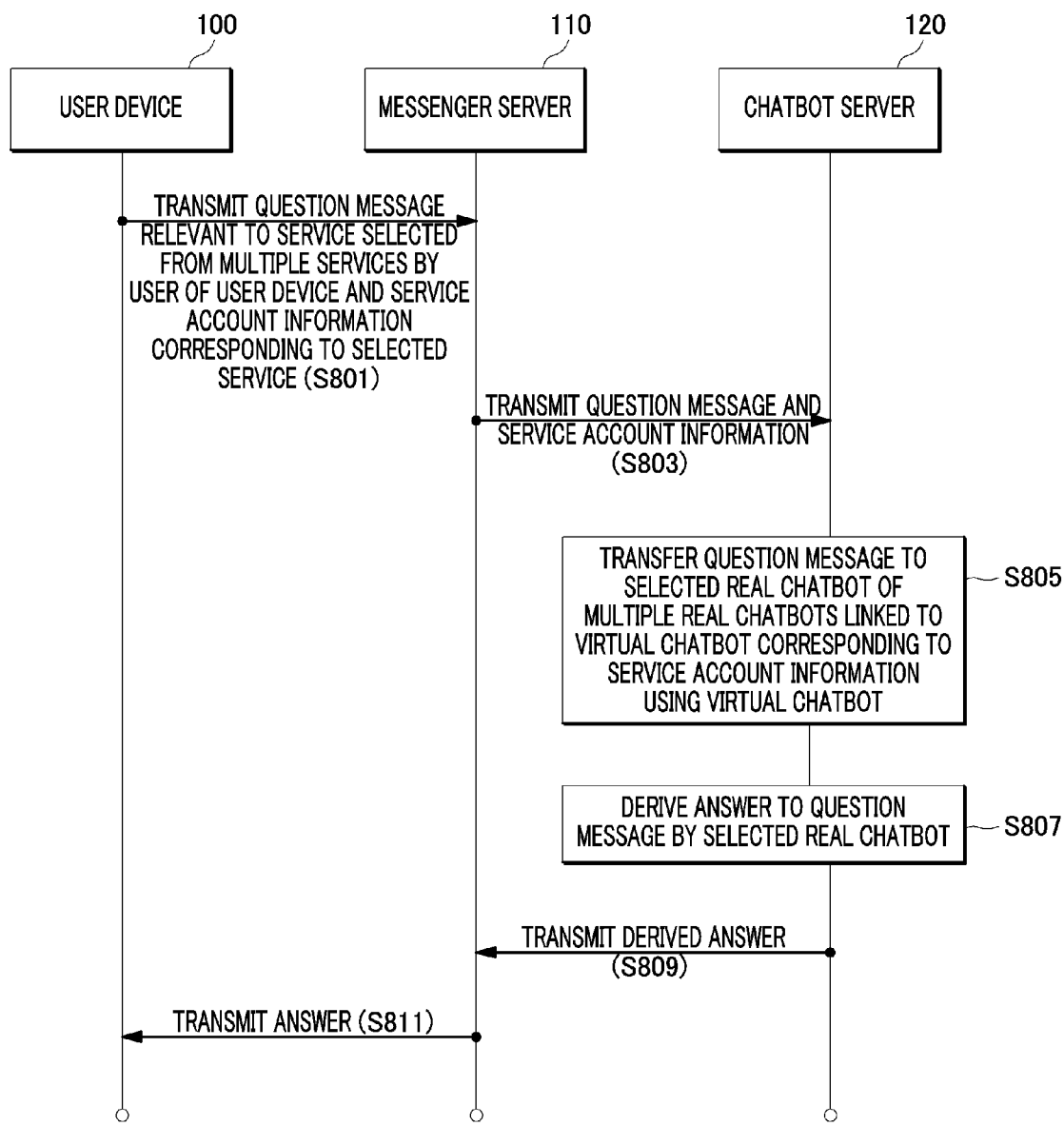

PROVIDING INSTANT MESSAGING SERVICE

CROSS-REFERENCE TO RELATED APPLICATION

This application claims the benefit under 35 USC 119(a) of Korean Patent Application No. 10-2017-0169712 filed on 11 Dec. 2017, in the Korean Intellectual Property Office, the entire disclosures of which are incorporated herein by reference for all purposes.

TECHNICAL FIELD

The present disclosure relates to technologies for providing an instant messaging service and more particularly, to technologies for providing an instant messaging service using a virtual chatbot connected to multiple real chatbots.

BACKGROUND

A chatbot is a chat robot, i.e., an artificial intelligence communication program that provides humans with right answers to questions or various relevant information through text chat with the humans based on artificial intelligence. Such a chatbot is provided as an interactive service using a messenger application according to preset rules or artificial intelligence technologies.

Referring to FIG. 1, a conventional system for providing a chatbot service will be described. According to the chatbot service providing system, each chatbot service is one-to-one mapped to each real chatbot and a chat service is provided through the mapped real chatbot. For example, if a chatbot server 20 receives a chatbot ID for a first chatbot service and a question message from a user device 10, the chatbot server 20 provides the user device 10 with an answer to the question message through a first real chatbot corresponding to the received chatbot ID, and if the chatbot server 20 receives a chatbot ID for a second chatbot service and a question message from the user device 10, the chatbot server 20 provides the user device 10 with an answer to the question message through a second real chatbot corresponding to the received chatbot ID.

According to the conventional chatbot service, each chatbot service is linked to only one real chatbot to provide a chat service. Therefore, in order to update the real chatbot, the chat service provided through the real chatbot should to be stopped.

SUMMARY

At least some of the embodiments described herein facilitate a server, a device and a method for deriving an answer to a question message relevant to a service selected by a user device among multiple services from any one of multiple real chatbots linked to a virtual chatbot corresponding to the selected service and transmitting the derived answer to the user device.

Further, at least some of the embodiments described herein includes a server, a device and a method for generating a mapping table correlating t the virtual chatbot with the multiple real chatbots linked to the virtual chatbot and dynamically allocating a processing ratio to each of the multiple real chatbots by using the virtual chatbot according to the mapping table.

Furthermore, at least some of the embodiments described herein includes a server, a device and a method for processing a question message through the multiple reach chatbots linked to the virtual chatbot according to the mapping table to execute an A/B test among the real chatbots.

Moreover, at least some of the embodiments described herein includes a server, a device and a method for gradually increasing a traffic processing ratio of a real chatbot under development by dynamically changing a traffic processing ratio of each of the multiple real chatbots linked to the virtual chatbot and thus reducing the sense of difference in chat caused by a change of real chatbots.

Besides, at least some of the embodiments described herein includes a server, a device and a method capable of storing session information between the user device and a real chatbot and using the session information in a chat with the user device for a next service.

At least some of the embodiments described herein pertain to a chatbot server that provides an instant messaging service using a virtual chatbot linked to multiple real chatbots that includes: a receiving unit that receives, from a messenger server, a question message relevant to a service selected from multiple services by a user device and service account information corresponding to the selected service; a derivation unit that derives an answer to the question message using the virtual chatbot corresponding to the service account information; and a transmission unit that transmits the answer to the messenger server, wherein the virtual chatbot transfers the question message to a selected real chatbot of the multiple real chatbots linked to the virtual chatbot, and the selected real chatbot derives the answer to the question message and transfers the answer to the virtual chatbot.

At least one of the embodiments described herein pertains to a method for providing an instant messaging service by a chatbot server using a virtual chatbot linked to multiple real chatbots, that includes: receiving a question message relevant to a service selected by a user device from multiple services and service account information corresponding to the selected service from a messenger server; transferring the question message to a selected real chatbot of the multiple real chatbots via the virtual chatbot corresponding to the service account information; deriving an answer to the question message by the selected real chatbot; and transmitting the answer to the messenger server.

According to any one of the embodiments described above, it is possible to provide a server, a device and a method for deriving an answer to a question message relevant to a service selected by a user device among multiple services from any one of multiple real chatbots linked to a virtual chatbot corresponding to the selected service and transmitting the derived answer to the user device.

Further, it is possible to provide a server, a device and a method for generating a mapping table between the virtual chatbot and the multiple real chatbots linked to the virtual chatbot and dynamically allocating a processing ratio to each of the multiple real chatbots by using the virtual chatbot according to the mapping table.

Furthermore, it is possible to provide a server, a device and a method for processing a question message through the multiple reach chatbots linked to the virtual chatbot according to the mapping table to execute an A/B test among the real chatbots.

Moreover, it is possible to provide a server, a device and a method for gradually increasing a traffic processing ratio of a real chatbot under development by dynamically changing a traffic processing ratio of each of the multiple real chatbots linked to the virtual chatbot and thus reducing the sense of difference in chat caused by a change of real chatbots.

Besides, it is possible to provide a server, a device and a method capable of storing session information between the user device and a real chatbot and using the session information in a chat with the user device for a next service.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 7 is a example depictions to explain session information in accordance with various embodiments described herein.

FIG. 8 is a flowchart illustrating an example processing flow for providing an instant messaging service by a chatbot server in accordance with various embodiments described herein.

DETAILED DESCRIPTION

Figure 1:
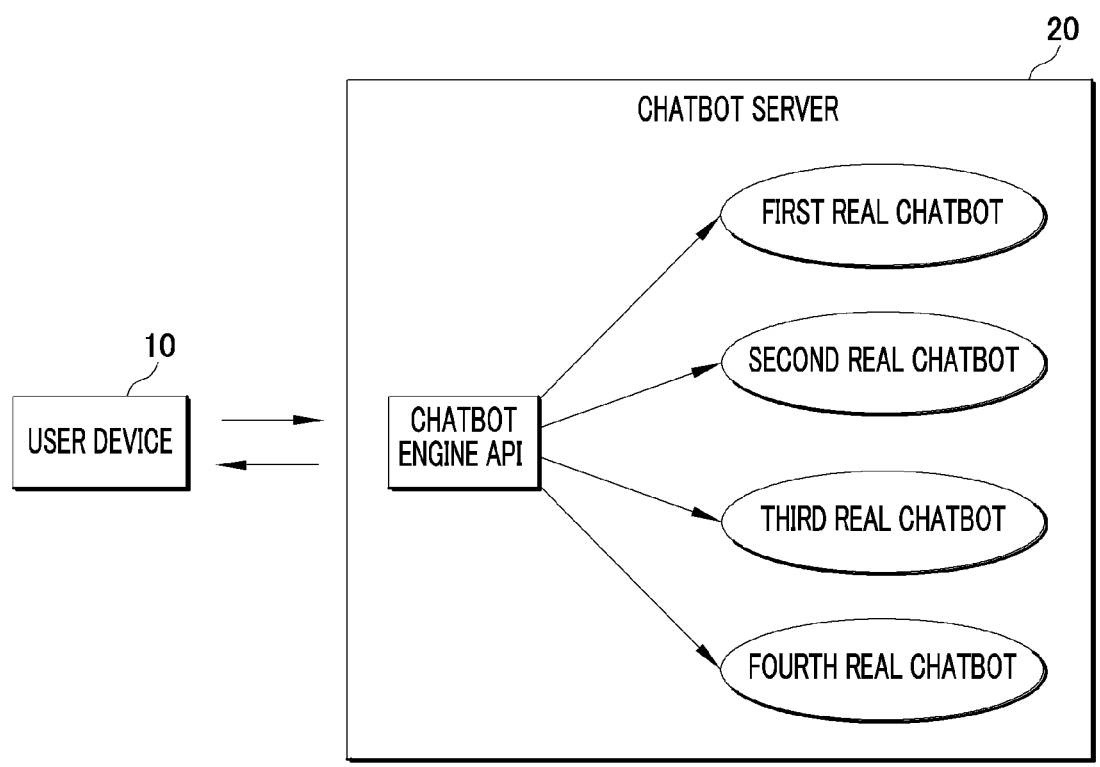
FIG. 1 is an example depictions to explain a method for providing a conventional instant messaging service in accordance with various embodiments described herein.

Hereafter, example embodiments of the present disclosure will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" that is used to designate a connection or coupling of one element to another element includes both an element being "directly connected" another element and an element being "electronically connected" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware. However, the "unit" is not limited to the software or the hardware and may be stored in an addressable storage medium or may be configured to implement one or more processors. Accordingly, the "unit" may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and functions provided by the "units" can be combined with each other or can be divided up into additional components. Further, the components and the "units" may be configured to implement one or more CPUs in a device or a secure multimedia card.

The term "user device" to be described below may be implemented with computers or portable devices which can access a server or another device through a network. Herein, the computers may include, for example, a notebook, a desktop, and a laptop equipped with a WEB browser. The portable devices are, for example, wireless communication devices that ensure portability and mobility and may include a smart phone, a tablet PC, a wearable device and various kinds of devices equipped with a communication module such as Bluetooth (BLE, Bluetooth Low Energy), NFC, RFID, ultrasonic waves, infrared rays, WiFi, LiFi, and the like. Further, the term "network" refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

Figure 2:
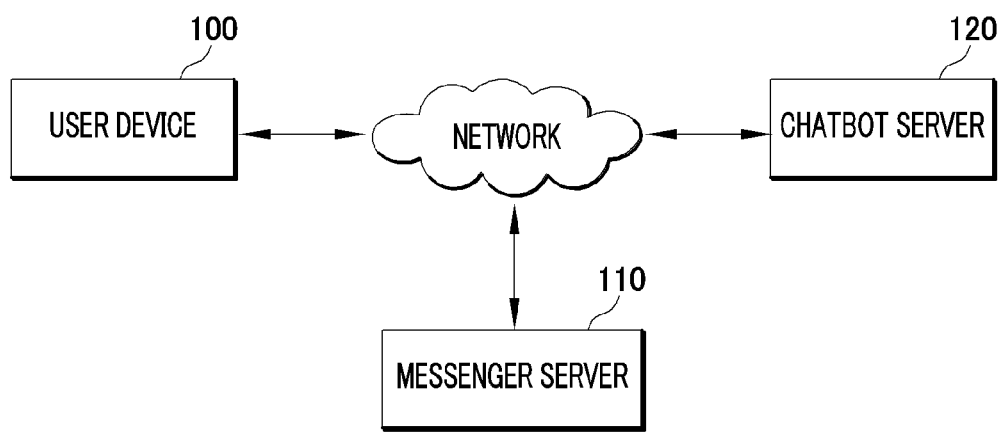
FIG. 2 is an illustration of an example of an instant messaging service providing system in accordance with various embodiments described herein.

FIG. 2 is an illustration of an example of an instant messaging service providing system in accordance with at least one embodiment described herein.

Referring to FIG. 2, an instant messaging service providing system may include a user device 100, a messenger server 110, a chatbot server 120, and a session information database (not illustrated). The instant messaging service providing system illustrated in FIG. 2 is just an embodiment of the present disclosure and should not be construed as liming the present disclosure. That is, the instant messaging service providing system can be configured differently from that shown in FIG. 2 according to various embodiments of the present disclosure.

Friends who can be registered through a messenger app installed in the user device 100 may include real friends and virtual friends.

A user of the user device 100 may register another user without a profit-making purpose (e.g., family, acquaintances, coworkers, etc.) as a real friend through the messenger app. The user device 100 may provide the user with an instant messaging service that enables the user to exchange chats with the other user registered as a real friend in a chat room through the messenger app installed in the user device 100.

Further, the user of the user device 100 may register an official account corresponding to a specific service as a virtual friend through the messenger app. The official account may refer to an account that is managed by a specific company to provide the specific service. For example, the official account may provide information about the specific service to the user device 100 through a chat room established for the official account and the user device 100. The user device 100 may register the official account as a virtual friend and receive the information about the specific service from the official account. Even if the user device 100 does not register the official account as a virtual friend, the user device 100 may also receive the information about the specific service.

The official account may use a chatbot to provide the user device 100 with the information about the specific service provided by the specific company. A manager of the official account may generate the chatbot through a user interface for bot builder provided by the chatbot server 120 and link the generated chatbot to the official account to provide the information about the specific service (for example, an answer to a question message relevant to the specific service). Further, the manager of the official account may manage the official account matched with a chatbot one to one through the user interface for bot builder or extend and link the official account to multiple chatbots.

Further, the user of the user device 100 may register a chatbot corresponding to the specific service as a virtual friend through the messenger app. For example, the chatbot registered as a virtual friend may provide the user device 100 with information about a weather service, a stock service, a traffic service, and the like.

Therefore, if the user device 100 registers an official account as a virtual friend, the user device 100 may be provided with an answer to a question message through a chatbot linked to the official account, and if the user device 100 registers a chatbot as a virtual friend, the user device 100 may be provided with an answer to a question message through the chatbot.

It is impossible to identify whether the chatbot linked to the official account or the chatbot registered as a virtual friend is a virtual chatbot or a real chatbot, through the user device 100. That is, a chatbot apparently displayed on the user device 100 is just a virtual friend to provide an instant messaging service corresponding to a specific service, and it is possible to identify whether the chatbot is a real chatbot or a virtual chatbot linked to multiple real chatbots, through the user interface for bot builder provided by the chatbot server 120 that generates/manages a "chatbot".

The user device 100 may provide the user with an instant messaging service that enables the user to exchange chats with, e.g., a chatbot or an official account registered as a virtual friend in a chat room through the messenger app. Further, the user device 100 may invite the chatbot registered as a virtual friend into a chatroom established for the user device 100 and a real friend.

The user device 100 may receive selection of any one of multiple services provided through the messenger app installed in the user device 100 from the user. For example, the multiple services may include a service provided by the official account and a service provided by the chatbot. If the user selects the official account or the chatbot which are virtual friends, the user can be provided with the service provided by the official account or the service provided by the chatbot through the chat room.

If the user device 100 receives selection of one of the multiple services provided through the messenger app installed in the user device 100 from the user, the user device 100 may transmit service account information corresponding to the selected service to the messenger server 110. For example, the service account information may include a chatbot ID (a virtual chatbot ID or a real chatbot ID) corresponding to the selected service or an official account ID of an official account corresponding to the selected service.

Further, if the user device 100 receives a question message relevant to the service selected by the user from the user through the chat room, the user device 100 may transmit the question message to the messenger server 110. The service account information and the question message may be transferred to the chatbot server 120 via the messenger server 110.

The messenger server 110 may provide an instant messaging service that enables the user device 100 to exchange chats with another user registered as a real friend in a chat room. Further, the messenger server 110 may provide an instant messaging service that enables the user device 100 to exchange chats with a chatbot or official account registered as a virtual friend at the messenger app.

For example, if the messenger server 110 receives a chatbot ID and a question message relevant to the selected service from the user device 100, the messenger server 110 may transfer the received chatbot ID and question message to the chatbot server 120. For another example, if the messenger server 110 receives an official account ID and a question message relevant to the selected service from the user device 100, the messenger server 110 may transfer the received official account ID (or a chatbot ID mapped to the received official account ID) and the received question message to the chatbot server 120.

The messenger server 110 may receive an answer to the question message derived through the chatbot from the chatbot server 120. The messenger server 110 may transmit the received answer to a chat room established for the user device 100 and the chatbot or a chat room established for the user device 100 and the official account.

If the chatbot server 120 receives an official account ID and a question message from the messenger server 110, the chatbot server 120 may derive an answer to the question message using a virtual chatbot or a real chatbot corresponding to the official account ID.

If the chatbot server 120 receives a real chatbot ID and a question message from the messenger server 110, the chatbot server 120 may derive an answer to the question message using a real chatbot corresponding to the real chatbot ID.

If the chatbot server 120 receives a virtual chatbot ID and a question message from the messenger server 110, the chatbot server 120 may derive an answer to the question message using a virtual chatbot corresponding to the virtual chatbot ID. Specifically, the chatbot server 120 may transfer the question message to a selected real chatbot of multiple real chatbots linked to the virtual chatbot and derive an answer to the question message through the selected real chatbot that has received the question message.

The chatbot server 120 may transmit the derived answer to the messenger server 110. The answer transmitted to the messenger server 110 may be transferred to the user device 100.

A virtual chatbot suggested in the present disclosure does not refer to a chatbot actually having data unlike a conventional real chatbot, but may refer to an intermediate medium configured to dynamically transfer a question message of the user to multiple real chatbots and derive an answer to the question message according to an answer policy of a chatbot manager (e.g., a mapping table set by the chatbot manager).

Accordingly, a virtual chatbot can be considered as a political and structural algorithm to process the question message of the user by the chatbot server 120 and thus is not directly displayed through the user device 100 but just displayed as a "chatbot" for a corresponding service. Therefore, if the chatbot server 120 sets a virtual chatbot to be linked to multiple real chatbots according to the mapping table, the user may recognize a "structure configured to derive an answer through a virtual chatbot and multiple real chatbots linked to the virtual chatbot" as an "apparent chatbot" for a corresponding service without distinction between a virtual chatbot and a real chatbot and determine that the answer has been derived by the apparently recognized chatbot regardless of any real chatbot.

Accordingly, in an embodiment of the present disclosure, the chatbot manager provides the same service through the "chatbot" recognized as a service and may enable answers derived by real chatbots of different versions to be provided to the user of the user device 100 using the "chatbot".

The present disclosure is provided to enable the user not to feel the sense of difference between the answers derived by the different real chatbots. To reduce the sense of difference between the answers, context information which can be derived from chats between each real chatbot and the user device may be used.

The operations of the respective components included in the instant messaging service providing system illustrated in FIG. 2 will be described in more detail with reference to the accompanying drawings.

Figure 3:
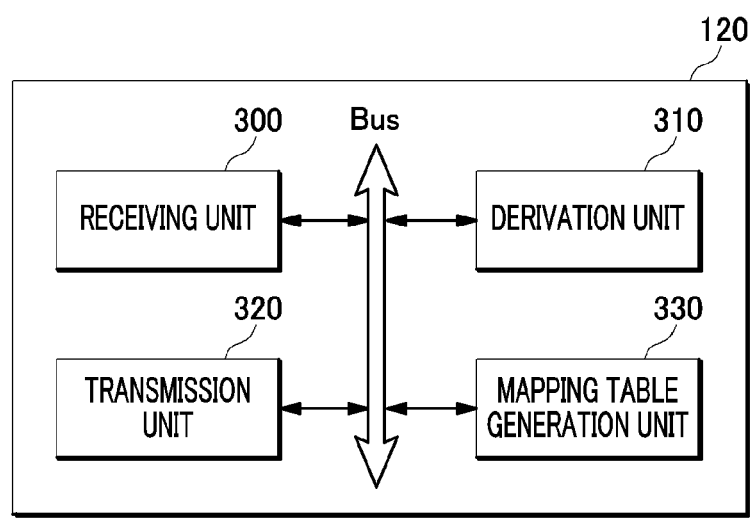
FIG. 3 is a block diagram illustrating an example of a chatbot server in accordance with various embodiments described herein.

FIG. 3 is a block diagram illustrating an example of the chatbot server 120 in accordance with an embodiment of the present disclosure. Referring to FIG. 3, the chatbot server 120 according to an embodiment of the present disclosure may include a receiving unit 300, a derivation unit, a transmission unit 320, and a mapping table generation unit 330. However, the chatbot server 120 according to an embodiment of the present disclosure can be configured differently from that shown in FIG. 3.

If the receiving unit 300 receives selection of one of multiple services registered at a messenger app that provides an instant messaging service from the user of the user device 100, the receiving unit 300 may receive service account information corresponding to the selected service from the messenger server 110.

If the receiving unit 300 receives selection of a service provided by a specific official account among the multiple services from the user of the user device 100, the receiving unit 300 may transmit an official account ID or a chatbot ID (a virtual chatbot ID or a real chatbot ID) corresponding to the selected service to the messenger server 110 and receive the official account ID or the chatbot ID (the virtual chatbot ID or the real chatbot ID) from the messenger server 110.

For another example, if the receiving unit 300 receives selection of a service provided by a specific chatbot among the multiple services from the user of the user device 100, the receiving unit 300 may transmit a chatbot ID (a virtual chatbot ID or a real chatbot ID) corresponding to the selected service to the messenger server 110 and receive the chatbot ID from the messenger server 110. Herein, the service provided by the chatbot may include, for example, a weather service, a store service, a shopping mall service, and the like. For example, if the user of the user device 100 selects the weather service provided by the chatbot from among the multiple services registered at the messenger app, the receiving unit 300 may receive a virtual chatbot ID or a real chatbot ID corresponding to the weather service from the messenger server 110.

Further, the receiving unit 300 may receive a question message relevant to a service selected by the user from the messenger server 110. For example, if the user selects the weather service, a question message relevant to weather may be transmitted from the user device 100 to the messenger server 110 and the receiving unit 300 may receive the question message from the messenger server 110.

Figure 4:
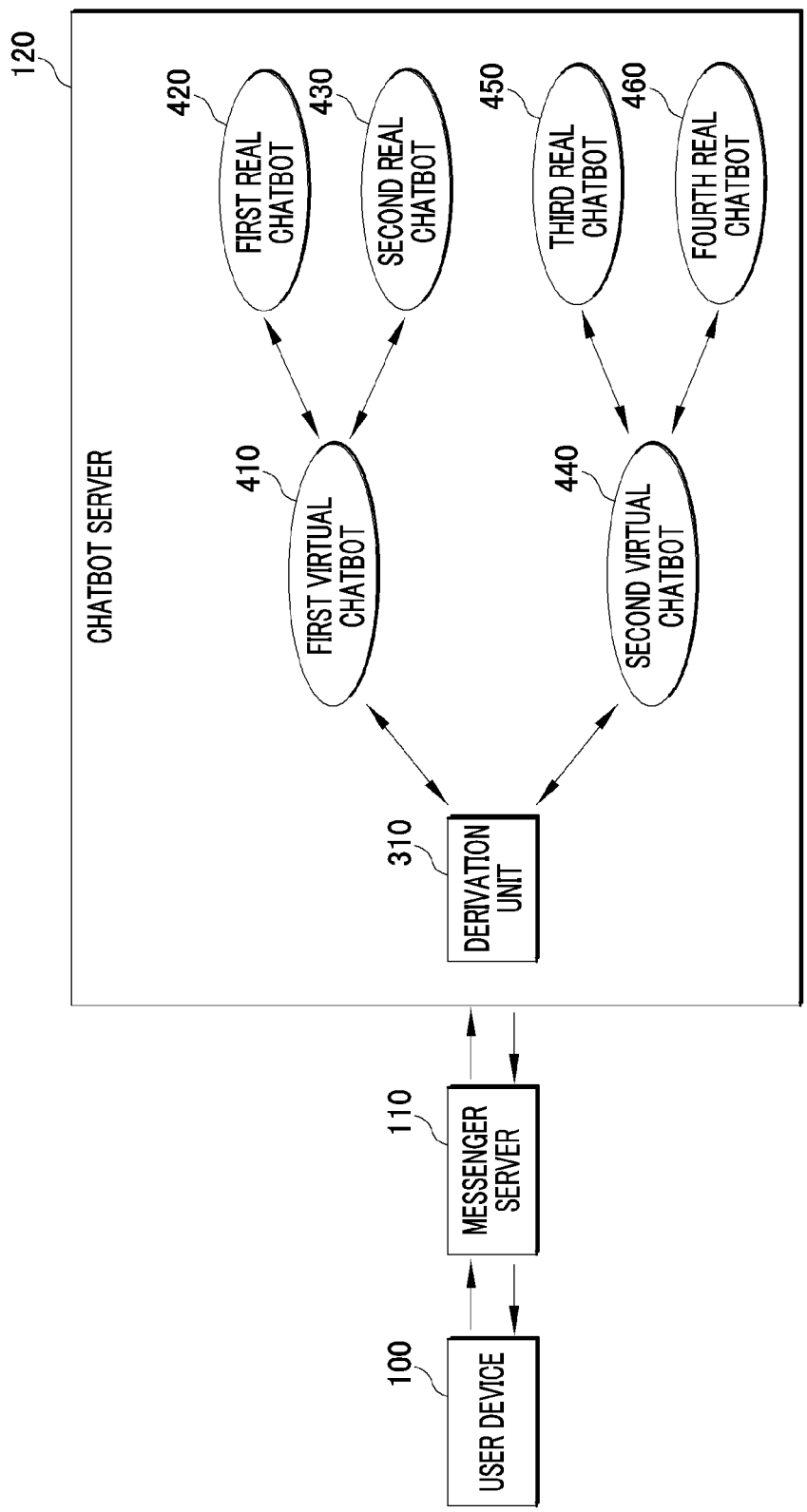
FIG. 4 is an illustration of an example of to explain a method for providing an instant messaging service using a virtual chatbot in accordance with various embodiments described herein.

Referring to FIG. 4, the multiple services are allocated virtual chatbot IDs corresponding to the respective services and the services are provided through virtual chatbots corresponding to the respective allocated virtual chatbot IDs. Each of the virtual chatbots is linked to multiple real chatbots each configured to derive an answer to a question message relevant to each service according to a preset mapping table corresponding to each virtual chatbot.

For example, a first service is assumed to be a service provided by an official account of a company A. To provide the first service, an official account corresponding to the first service may be mapped to a first virtual chatbot 410 and answers to a question message processed by multiple real chatbots 420 and 430 linked to the first virtual chatbot 410 may be provided to the user device 100 through the messenger server 110.

For another example, a second service is assumed to be a service provided by an official account of a company B. To provide the second service, an official account corresponding to the second service may be mapped to a second virtual chatbot 440 and answers to a question message processed by multiple real chatbots 450 and 460 linked to the second virtual chatbot 440 may be provided to the user device 100 through the messenger server 110.

Figure 5:
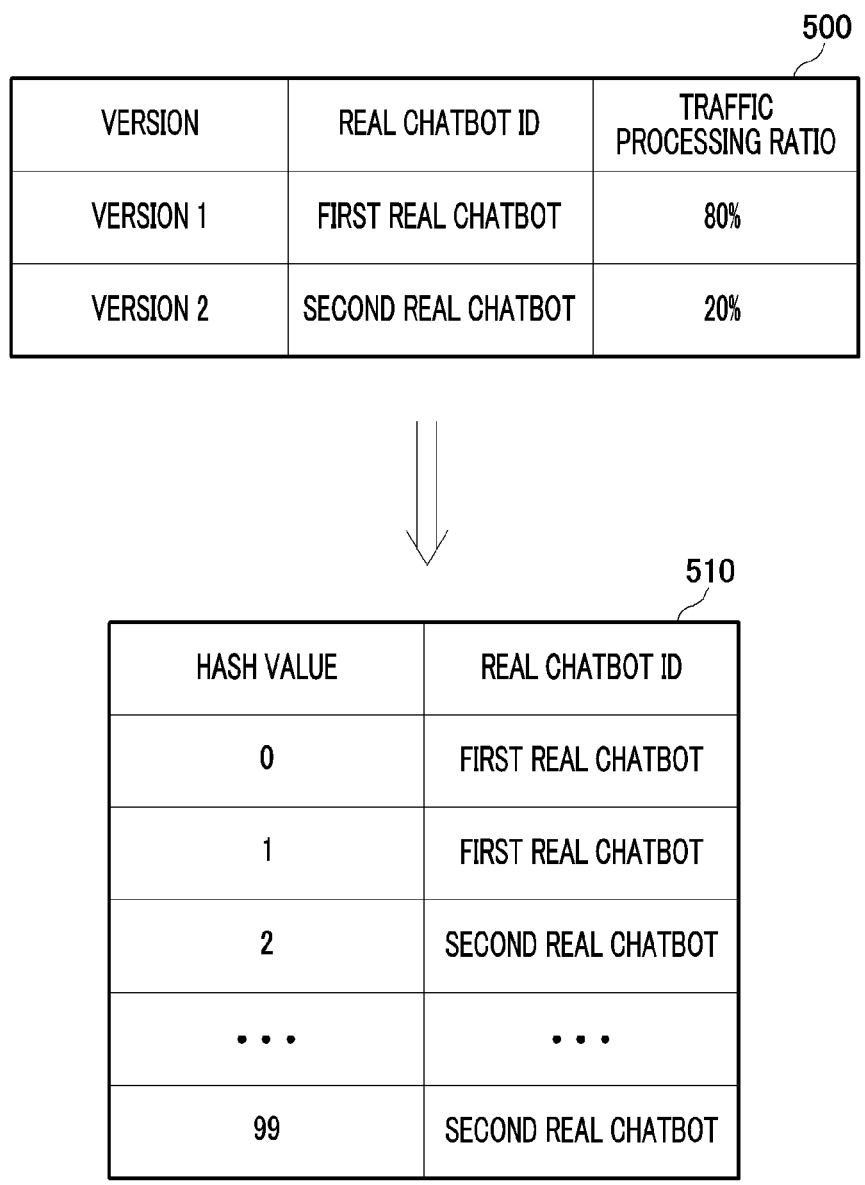
FIG. 5 is an illustration of an example of a mapping table in accordance with various embodiments described herein.

Referring to FIG. 3 again, the mapping table generation unit 330 may generate a mapping table about a traffic processing ratio for a question message to be processed by multiple real chatbots linked to each virtual chatbot. Such a mapping table may be generated for each virtual chatbot. Referring to FIG. 4 and FIG. 5, if multiple real chatbots linked to the first virtual chatbot 410 include the first real chatbot 420 and the second real chatbot 430, the mapping table generation unit 330 may set a traffic processing ratio for a question message in each of the first real chatbot 420 and the second real chatbot 430. For example, referring to reference numeral 500, if first real chatbot 420 is a first version (existing version) chatbot and the second real chatbot 430 is a second version (new version) chatbot under development, the mapping table generation unit 330 may allocate a first traffic processing ratio (e.g., 80%) to the first real chatbot 420 and a second traffic processing ratio (e.g., 20%) to the second real chatbot 430. If a virtual chatbot receives 100 question messages from the user device 100, the virtual chatbot may transfer 80 out of the 100 question messages to the first real chatbot 420 and 20 out of the 100 question messages to the second real chatbot 430 with reference to the traffic processing ratios set in the mapping table.

Referring to reference numeral 510, the mapping table generation unit 330 may store IDs of multiple real chatbots in multiple slots assigned different hash values, respectively, based on the set traffic processing ratios. For example, the mapping table generation unit 330 sets the sizes of hash spaces to generate a mapping table as N number of slots, calculates hash values using a hash function and then assigns the calculated hash values to the respective slots. The mapping table generation unit 330 may generate a mapping table by mapping an ID of the first real chatbot 420 and an ID of the second real chatbot 430 to the N number of slots according to the traffic processing ratios set for the first real chatbot 420 and the second real chatbot 430. In this case, a ratio of mapping the ID of the first real chatbot 420 in the mapping table corresponds to the first traffic processing ratio and a ratio of mapping the ID of the second real chatbot 430 corresponds to the second traffic processing ratio. For example, if the first traffic processing ratio of the first real chatbot 420 is 80% and the second traffic processing ratio of the second real chatbot 430 20% and the mapping table includes 100 slots, the ID of the first real chatbot 420 may be allocated to 80 slots in the mapping table and the ID of the second real chatbot 430 may be allocated to 20 slots in the mapping table and allocation locations may be determined based on a predetermined algorithm.

The derivation unit 310 may derive an answer to a question message using a virtual chatbot corresponding to a virtual chatbot ID received from the user device 100.

The derivation unit 310 may transfer the question message received from the user device 100 to the virtual chatbot corresponding to the received virtual chatbot ID. In this case, the virtual chatbot may transfer the question message to any one of multiple real chatbots linked to the virtual chatbot. Among the multiple real chatbots, the real chatbot that has received the question message may derive an answer to the question message. The real chatbot that has received the question message may transfer the derived answer to the virtual chatbot.

For example, the derivation unit 310 may derive a real chatbot ID of a real chatbot to process a question message from the mapping table for the virtual chatbot and transfer the derived real chatbot ID to a bot DB (not illustrated), and the bot DB may detect bot metadata corresponding to the received real chatbot ID from bot-relevant metadata previously stored therein. Then, the derivation unit 310 may receive the bot metadata of the real chatbot corresponding to the real chatbot ID from the bot DB and derive an answer to the question message based on the received bot metadata of the real chatbot.

Figure 6A:
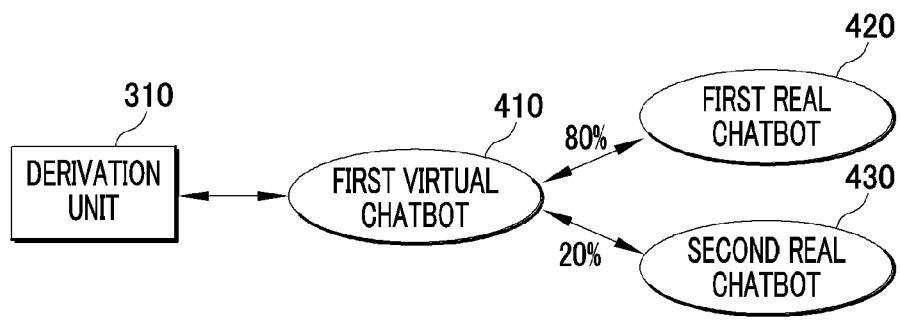
FIG. 6A and FIG. 6B are example depictions to explain a method for providing an instant messaging service in accordance with various embodiments described herein.

Referring to FIG. 5 and FIG. 6A, a virtual chatbot may transfer a question message to any one of multiple real chatbots based on a preset mapping table between the virtual chatbot and the multiple real chatbots.

The virtual chatbot may transfer a question message to any one of multiple real chatbots based on the traffic processing ratios set in the mapping table for the virtual chatbot.

For example, the first virtual chatbot 410 may execute an A/B test by transferring a question message to both of the first real chatbot 420 and the second real chatbot 430 based on traffic processing ratios set in a mapping table for the first virtual chatbot.

The A/B test is a test designed to intuitively survey the user's preference to optimize a user interface for a specific service, and in the A/B test, a service A and a service B are provided randomly to the user and a result thereof is fed back from the user to measure the user's preference for each service.

In the present disclosure, a mapping table in which a virtual chatbot is matched with multiple real chatbots may be generated and the above-described A/B test may be executed using a virtual chatbot according to the mapping table. A preference for each real chatbot may be derived as an index for the number of answers provided by each real chatbot, the number of traffics for each real chatbot, the number of chats between each real chatbot and the user device 100, and the like. The index may be normalized and then provided to the chatbot manager. Therefore, it can be used as data about the bot performance even if a traffic processing ratio is set differently for the multiple real chatbots.

Specifically, the first real chatbot 420 may perform a test for processing an answer to a question message at the first traffic processing ratio (e.g., 80%) set for the first real chatbot 420 and the second real chatbot 430 may perform a test for processing an answer to a question message at the second traffic processing ratio (e.g., 20%) set for the second real chatbot 430. In this case, the first real chatbot 420 may process answers to 8 out of 10 question messages and the second real chatbot 430 may process answers to the other 2 question messages.

If a real chatbot that processes an answer to a question message is suddenly changed from the first real chatbot 420 to the second real chatbot 430, the user may feel the sense of difference in chat. In the present disclosure, to reduce the sense of difference, a low traffic process ratio may be set for the new version second real chatbot 430 and the A/B test may be executed to gradually increase the traffic processing ratio of the second real chatbot 430 and then the second real chatbot 430 may be employed to provide a real service.

Figure 6B:
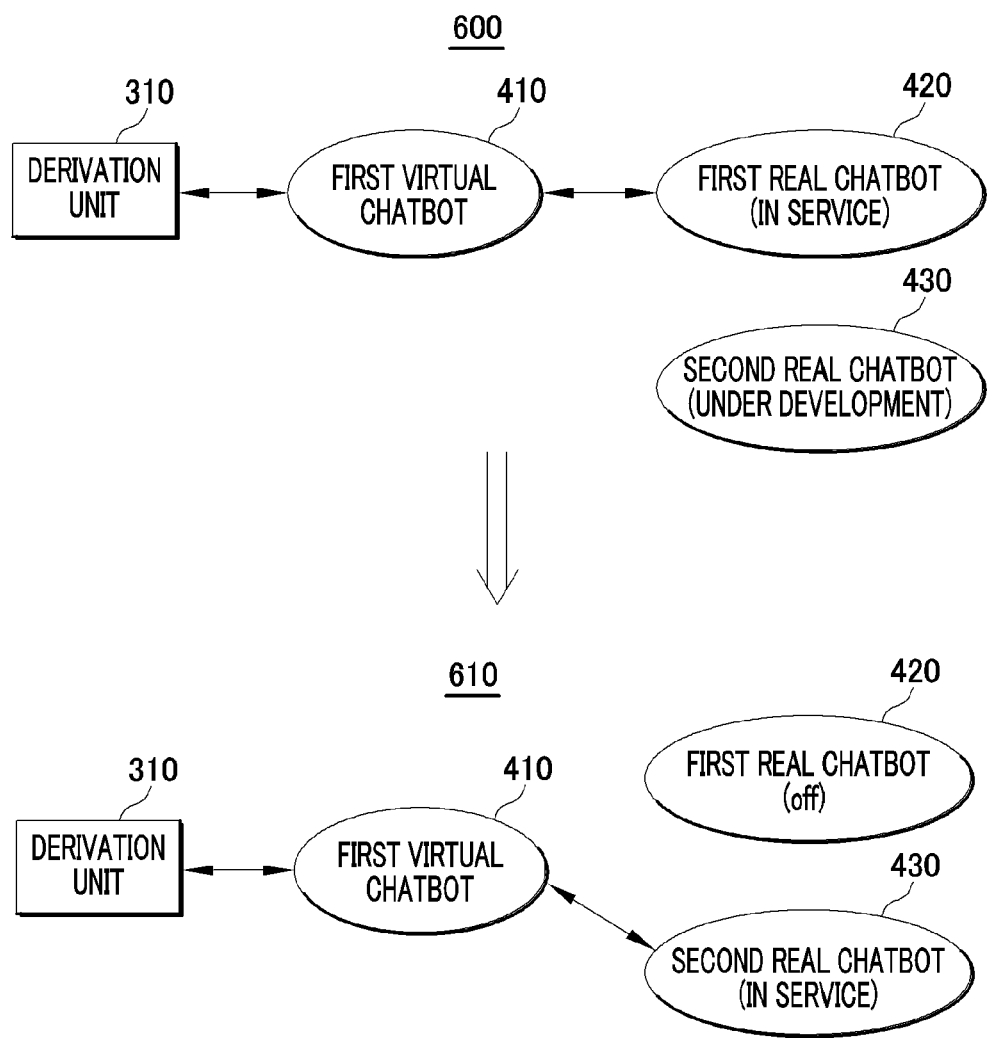

Referring to FIG. 6B, reference numerals 600 and 610 show a method for processing an answer to a question message in the case where the first real chatbot 420 is a chatbot for an available service capable of providing an answer to a question message and the second real chatbot 430 is a chatbot for an unavailable service under development. In the beginning 600, the first virtual chatbot 410 may transfer a question message only to the first real chatbot 420 capable of providing an answer service and derive an answer to the question message from the first real chatbot 420.

Thereafter 610, the first virtual chatbot 410 may modify the mapping table through the mapping table generation unit 330 in order to increase an answer processing ratio for a question message in second real chatbot 430. Herein, the mapping table generation unit 330 may adjust a traffic processing ratio of each of the first real chatbot 420 and the second real chatbot 430 depending on input from the chatbot manager. Specifically, the mapping table generation unit 330 may gradually decrease the traffic processing ratio of the first real chatbot 420 and gradually increase the traffic processing ratio of the second real chatbot 430 accordingly. In the end, the first virtual chatbot 410 may change a chatbot for an available service capable of providing an answer to a question message from the first real chatbot 420 to the second real chatbot 430 through the above-described process.

Referring to FIG. 3 again, the receiving unit 300 may further receive an ID of the user of the user device 100 from the messenger server 110. The derivation unit 310 may transfer the user ID received from the receiving unit 300 to a virtual chatbot. Herein, the virtual chatbot may convert the user ID into a hash value, search for a slot corresponding to the converted hash value among multiple slots in the mapping table for the virtual chatbot, and extract an ID of a real chatbot stored in the searched slot. The virtual chatbot may transfer a question message to a real chatbot corresponding to the extracted real chatbot ID.

The virtual chatbot may derive session information of the user device 100 from a session information database (not illustrated) using the user ID. Referring to FIG. 7, the session information database (not illustrated) may store mapping information 700 between a user and a service selected by the user for each user ID. In the mapping information 700, a user ID, a virtual chatbot ID of a virtual chatbot corresponding to a service which has used by the user, a real chatbot ID of a real chatbot that processes an answer, and session information may be mapped and stored. Herein, the session information may include at least one of chat state information (e.g., information about whether a chat is ongoing or ended), chat context information (e.g., information about the context determined by keywords included in the chat), and chat time information (e.g., information about the time elapsed after the chat). Further, the session information database may store chat state information, chat context information, chat time information, etc. corresponding to a last chat between the user device 100 and a specific chatbot. Further, the session information database may differentiate information about a chat with a virtual chatbot from information about a chat with a real chatbot and store them for each chatbot.

The virtual chatbot may determine whether or not any one of multiple real chatbots is chatting with the user device 100 based on the session information derived using the user ID. For example, the virtual chatbot may determine whether the real chatbot is chatting with the user device 100 based on chat state information and chat time information among the session information.

If the virtual chatbot determines that any one real chatbot is chatting with the user device 100 based on the derived session information, the virtual chatbot may transfer a question message received from the user to the real chatbot chatting with the user device 100. For example, if the user device 100 is chatting with the first real chatbot in a service selected by the user device 100, a question message of the user is transferred to the first real chatbot. In other words, the virtual chatbot may enable the real chatbot chatting with the user device 100 among the multiple real chatbots to derive an answer to the question message.

If a mapping table for the virtual chatbot that relays a service selected by the user is modified (e.g., if traffic processing ratios of multiple real chatbots corresponding to the virtual chatbot are adjusted), the virtual chatbot may apply the modified mapping table to the service after a chat between the user device 100 and any one real chatbot is ended.

Specifically, if the virtual chatbot determines that any one real chatbot is not chatting with the user device 100 based on the derived session information, the virtual chatbot may transfer the question message to another real chatbot different from the any one real chatbot based on the traffic processing ratios set in the mapping table for the virtual chatbot. For example, if a chatbot for processing an answer to a question relevant to a service selected by the user device 100 is changed from a first real chatbot to a second real chatbot, when the user device 100 uses the service again after a chat with the first real chatbot is ended, the user device 100 may start a chat with the second real chatbot. In this case, a session of the user device 100 with the first real chatbot may be stopped and a new session with the second real chatbot may be connected.

If a real chatbot that processes an answer to a question message relevant to at least one of the multiple services is changed (e.g., if a service version is updated), the virtual chatbot may store context information obtained from a previous chat between the user device 100 and the real chatbot that has processed an answer before the change in a chat information database (not illustrated) and use the chat context information during a chat between the user device 100 and a changed real chatbot to continue the context of the previous chat.

The transmission unit 320 may transmit an answer derived from the real chatbot to the question message of the user device 100 to the messenger server 110, and the answer may be transferred from the messenger server 110 to the user device 100.

Meanwhile, the chatbot server 120 may further include a bot builder unit (not illustrated) that provides a user interface for generating/managing a virtual chatbot to the chatbot manager.

For example, the chatbot manager may access the bot builder unit of the chatbot server 120 through a web or an app, generate a virtual chatbot through a user interface provided by the bot builder unit and select at least one of multiple real chatbots previously registered at the chatbot server 120 to link the at least one real chatbot to the generated virtual chatbot.

FIG. 8 is a flowchart illustrating an example processing flow for providing an instant messaging service in accordance with an embodiment of the present disclosure. Referring to FIG. 8, in a process S801, the chatbot server 120 may receive a question message relevant to a service selected by the user of the user device 100 from multiple services and service account information corresponding to the selected service from the user device 100 through messenger server 110.

In a process S803, the chatbot server 120 may receive the question message and the service account information from the messenger server 110.

In a process S805, the chatbot server 120 may transfer the question message to any one of multiple real chatbots linked to a virtual chatbot corresponding to the service account information using the virtual chatbot.

In a process S807, the chatbot server 120 may derive an answer to the question message by the any one real chatbot. Specifically, the chatbot server 120 may derive a real chatbot ID of a real chatbot to receive the question message from a mapping table for the virtual chatbot and transfer the derived real chatbot ID to the bot DB (not illustrated), and the bot DB may detect bot metadata corresponding to the received real chatbot ID from bot-relevant metadata previously stored therein. Then, the chatbot server 120 may receive the bot metadata of the real chatbot corresponding to the real chatbot ID from the bot DB and derive an answer to the question message based on the received bot metadata of the real chatbot.

In a process S809, the chatbot server 120 may transmit the derived answer to the messenger server 110. In a process S811, the messenger server 110 may transmit the answer to the user device 100.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A chatbot server that provides an instant messaging service using a virtual chatbot linked to multiple real chatbots, comprising:
   a receiving unit that receives, from a messenger server, a question message relevant to a service selected from multiple services by a user device and service account information corresponding to the selected service;
   a derivation unit that derives an answer to the question message using the virtual chatbot corresponding to the service account information; and
   a transmission unit that transmits the answer to the messenger server, wherein the virtual chatbot transfers the question message to at least one selected real chatbot of the multiple real chatbots linked to the virtual chatbot, and the at least one selected real chatbot derives the answer to the question message and transfers the answer to the virtual chatbot, wherein the multiple real chatbots comprise real chatbots of different versions, wherein the different versions include both an existing version and a new version of the multiple real chatbots,
   wherein the transfer of the question message by the virtual chatbot to the at least one selected real chatbot includes transferring the question message to at least one real chatbot of the new version at a first traffic processing ratio and to at least one real chatbot of the existing version at a second traffic processing ratio,
   wherein the first traffic processing ratio and the second traffic processing ratio are set based on whether the real chatbots are the existing version or the new version, and
   the first traffic processing ratio for the new version and the second traffic processing ratio for the existing version are changed simultaneously.

2. The chatbot server of claim 1, wherein the virtual chatbot transfers the question message to the selected real chatbot with reference to a preset mapping table correlating the virtual chatbot with the multiple real chatbots.

3. The chatbot server of claim 2, further comprising: a mapping table generation unit that sets the traffic processing ratios for question messages to be processed by the respective multiple real chatbots and generates a mapping table according to the set traffic processing ratios.

4. The chatbot server of claim 3, wherein the mapping table generation unit stores real chatbot IDs of the multiple real chatbots in multiple slots assigned different hash values, respectively, wherein the multiple slots are based on the set traffic processing ratios.

5. The chatbot server of claim 4, wherein the receiving unit further receives a user ID of the user device, and the virtual chatbot converts the user ID into a hash value, extracts a real chatbot ID stored in a slot corresponding to the converted hash value from the multiple slots, and transfers the question message to a real chatbot corresponding to the extracted real chatbot ID.

6. The chatbot server of claim 3, wherein the receiving unit further receives a user ID of the user device, and the virtual chatbot derives session information of the user device from a session information database by using the user ID.

7. The chatbot server of claim 6, wherein the session information includes at least one of chat state information, chat context information, and chat time information, and the virtual chatbot determines whether or not the user device is chatting with any one of the multiple real chatbots based on the session information.

8. The chatbot server of claim 7, wherein if the virtual chatbot determines that the user device is chatting with the any one real chatbot, the virtual chatbot transfers the question message to the any one real chatbot chatting with the user device.

9. The chatbot server of claim 8, wherein if the mapping table is modified, the virtual chatbot applies the modified mapping table after the chat between the user device and the any one real chatbot is ended.

10. The chatbot server of claim 7, wherein if the virtual chatbot determines that the user device is not chatting with the any one real chatbot, the virtual chatbot transfers the question message to another real chatbot different from the any one real chatbot based on the set traffic processing ratios.

11. The chatbot server of claim 10, wherein a session of the user device with the any one real chatbot is stopped and a new session with the another real chatbot is connected.

12. The chatbot server of claim 10, wherein the virtual chatbot uses context information obtained from a previous chat between the user device and the any one real chatbot during a chat between the user device and the another real chatbot.

13. The chatbot server of claim 1, wherein the real chatbots of the different versions are used to answer the question message.

14. The chatbot server of claim 1, wherein the first traffic processing ratio to the new version of the real chatbots is increased based on performance of the new version of the real chatbots.

15. A chatbot server that provides an instant messaging service using a virtual chatbot linked to multiple real chatbots, comprising:
   a receiving unit that receives, from a messenger server, a question message relevant to a service selected from multiple services by a user device and service account information corresponding to the selected service;
   a derivation unit that derives an answer to the question message using the virtual chatbot corresponding to the service account information;
   a mapping table generation unit that sets traffic processing ratios for question messages to be processed by the respective multiple real chatbots and generates a mapping table according to the set traffic processing ratios; and a transmission unit that transmits the answer to the messenger server, wherein the virtual chatbot transfers the question message to a selected real chatbot of the multiple real chatbots linked to the virtual chatbot, and the selected real chatbot derives the answer to the question message and transfers the answer to the virtual chatbot, wherein the multiple real chatbots comprise different versions of real chatbots, wherein the virtual chatbot transfers the question message to the selected real chatbot with reference to a preset mapping table correlating the virtual chatbot with the multiple real chatbots and with reference to the set traffic processing ratios, and wherein, if the multiple real chatbots include a first real chatbot and a second real chatbot, the virtual chatbot executes an AB test to measure a user preference of the user device for the first real chatbot and the second real chatbot and transferring the question message to both of the first real chatbot and the second real chatbot based on the set traffic processing ratios and the user preference for the first real chatbot and the second real chatbot.

16. The chatbot server of claim 15, wherein if the first real chatbot is a chatbot for an available service and the second real chatbot is a chatbot for an unavailable service under development, the virtual chatbot changes the chatbot for the available service from the first real chatbot to the second real chatbot by modifying the mapping table.

17. A method for providing an instant messaging service by a chatbot server using a virtual chatbot linked to multiple real chatbots, comprising: receiving a question message relevant to a service selected by a user device from multiple services and service account information corresponding to the selected service from a messenger server; transferring the question message to at least one selected real chatbot of the multiple real chatbots via the virtual chatbot corresponding to the service account information, wherein the multiple real chatbots comprise real chatbots of different versions, wherein the different versions include both an existing version and a new version of the multiple real chatbots wherein the transferring the question message to the at least one selected real chatbot includes transferring the question message to at least one real chatbot of the new version at a first traffic processing ratio and to at least one real chatbot of the existing version at a second traffic processing ratio, wherein the first traffic processing ratio and the second traffic processing ratio are set based on whether the real chatbots are the existing version or the new version, and the first traffic processing ratio for the new version and the second traffic processing ratio for the existing version are changed simultaneously; deriving an answer to the question message by the selected real chatbot; and transmitting the answer to the messenger server.

\* \* \* \* \*